3,697,483
SEQUENTIAL PROCESS OF PREPARING POLYURETHANE ELASTOMERS
Adolfas Damusis, Detroit, Mich., assignor to BASF Wyandottte Corporation, Wyandotte, Mich.
No Drawing. Filed Aug. 18, 1969, Ser. No. 851,099
Int. Cl. C08g 22/14
U.S. Cl. 260—75 NE                    11 Claims

ABSTRACT OF THE DISCLOSURE

Polyurethane elastomers produced by incorporating normally solid linear urethane polymers in a blend of liquid linear and branched isocyanate-terminated adducts and curing this composition to form a solid elastomer by incorporation of a curing agent. The normally solid linear urethane polymers are prepared by reacting linear organic compounds having at least 1 active hydrogen atom and an average equivalent weight of about 31 to 400 with isocyanate in the blend of liquid adducts. The blend of liquid isocyanate-terminated adducts is prepared by reaction of organic isocyanate with a linear alcohol having 2 hydroxyl groups and an average equivalent weight of about 500 to 1500 and a branched chain alcohol having more than 2 hydroxyl groups and an equivalent weight of about 45 to 2500.

---

This invention relates to polyurethanes and methods for their preparation. It is more particularly concerned with polyurethane elastomers possessing both high tear resistance and good resilience.

Polyurethane compositions are usually regarded as the reaction product of a polyisoyanate and an active hydrogen-containing organic compound such as a hydroxy-terminated polyester, polyesteramide, or polyether. The term "active hydrogen atoms" refers to hydrogens which display activity according to the Zerewitinoff test, as described by Kohler in J. Am. Chem. Soc., 49, 3181 (1927).

In general, the art has developed various methods of manufacturing polyurethanes. The preparation of polyurethanes is disclosed in many references, including the texts entitled Polyurethanes by Bernard A. Dombrow, published by Reinhold Publishing Corporation, New York, New York, 1957, and Polyurethanes: Chemistry and Technology by J. H. Saunders and K. C. Frisch, published by Interscience Publishers, New York-London, wherein disclosures are made of methods for producing polyurethanes.

It is disclosed in the prior art that urethane-urea cast elastomers can be prepared by a two-step process. In the first step, an isocyanate-terminated prepolymer is prepared by interacting, for example, polyether polyols, hydroxyl-terminated polyesters or transesterified castor oils and tolylene diisocyanate. In the second step, the prepolymer is interacted with a chemically hindered, aromatic diamine such as 4,4' - methylene - bis - (2-chloroaniline) under defined conditions of temperature, pressure and agitation and the reaction mixture is poured into a mold of any suitable configuration and cured at a temperature of about 100° C. whereby the desired urethane-urea elastomeric product is obtained.

Usually in synthesizing the prepolymers for elastomers the required degree of hardness is achieved by employing building blocks of a suitable size. With an increase of the molecular weight of the polyols, hydroxyl-terminated polyesters or transesterified castor oils, the main building blocks of the urethane polymers, the hardness of the products decreases, but the physical properties decrease as well.

Often products of a high tear, high resilience and of a certain hardness are desired. It is particularly difficult to produce soft elastomers with good resilience and high tear resistance. Usually, the high tear resistant elastomers have a negligible resilience, or highly resilient products have negligible tear.

Accordingly, it is a purpose of the instant invention to prepare polyurethane elastomers characterized by high tear resistance and good resilience.

This and other purposes are accomplished in accordance with the instant invention by incorporating normally solid linear urethane polymers in a blend of liquid linear and branched isocyanate-terminated adducts and curing this composition to form a solid elastomer by incorporation of a curing agent. The normally solid linear urethane polymers are prepared by reacting linear organic compounds having at least 1 active hydrogen atom and an average equivalent weight of about 31 to 400 with isocyanate in the blend of liquid adducts. The blend of liquid isocyanate-terminated adducts is prepared by reaction of organic isocyanate with a linear alcohol having 2 hydroxyl groups and an average equivalent weight of about 500 to 1500 and a branched chain alcohol having more than 2 hydroxyl groups and an average equivalent weight of about 45 to 2500.

The expression "normally solid linear urethane polymer" as used herein refers to linear urethane polymers that are solid at room temperature when isolated even though these urethane polymers are generally dissolved in the blend of liquid linear and branched isocyanate-terminated adducts. Since these urethane polymers would be solid if the adduct blend were not present, they are referred to herein as "normally solid linear urethane polymers."

The mole ratio of the linear alcohol having 2 hydroxyl groups to the branched chain alcohol having more than 2 hydroxyl groups employed in the preparation of the liquid isocyanate-terminated adducts is from about 3:1 to 18:1.

The amount of polyisocyanate required for reaction with the linear and branched chain alcohols to produce the blend of liquid isocyanate-terminated adducts will depend on the equivalent weight of the diols or polyols. Preferably, the amount of isocyanate used to prepare the liquid blend will be such that the ratio of isocyanate to hydroxyl groups referred to as the NCO/OH ratio is 1.5:1 to 2.5:1. The reaction is carried out in the presence or absence of a catalyst at a temperature of from about room temperature up to about 125° C.

The alcohols which may be used in preparing the blend of liquid adducts are preferably polyether polyols generally prepared by the condensation of an alkylene oxide such as ethylene oxide, propylene oxide, butylene oxide, tetrahydrofurane, or a blend thereof with a polyfunctional initiator, such as ethylene glycol, propylene glycol, butane diol, polylactone diols, polyester diols based on dibasic acids and ethylene or proplylene or aliphatic diols and the like for the linear alcohol having 2 hydroxyl groups and polyether polyols prepared by condensation of such alkylene oxides with trimethylolpropane, glycerol, pentaerythritol, hexanetriol, sorbitol, sucrose and the like for the branched chain alcohol having more than 2 hydroxyl groups.

Typical polyether polyols having 2 hydroxyl groups include polyoxyethylene glycol, polyoxypropylene glycol, polyoxybutylene glycol, polytetramethylene glycol, block copolymers, e.g., combinations of polyoxypropylene and polyoxyethylene glycols, poly - 1,2 - oxybutylene and polyoxymethylene glycols and poly - 1,4 - oxybutylene and polyoxyethylene glycols, and random copolymer glycols prepared from blends or sequential addition of 2 or more alkylene oxides.

Typical polyether polyols having more than 2 hydroxyl groups include adducts of the above with trimethylolpropane, glycerine and hexanetriol as well as the polyoxypropylene adducts of higher polyols such as pentaerythritol and sorbitol. It is preferred that the branched chain alcohols have from about 3 to 6 terminal hydroxyl groups and preferably about 3 to 4 terminal hydroxyl groups.

The linear organic compound is incorporated in the blend of liquid isocyanate-terminated adducts in a weight ratio of linear organic compound to liquid adduct blend of 1:1 to 1:3. Linear alcohols having 2 hydroxyl groups such as monomeric low molecular weight glycols and polyalkylene ether polyols are preferred as the linear organic compound to be used in forming the segments. These include, for example, ethylene glycol, 1,2-propylene glycol, 1,3-propylene glycol, 1,2-butanediol, 1,4-butanediol, 1,6-hexanediol and the oxyalkylene adducts of polyol bases wherein the oxyalkylene portion is derived from monomeric units such as ethylene oxide, propylene oxide, butylene oxide and mixtures thereof. The polyol bases include the above listed low molecular weight glycols and polyethers such as polyethylene ether glycols, polypropylene ether glycols, polytetramethylene ether glycols, low molecular weight polylactone type diols, and alkylene oxide adducts of dihydric alcohols including those listed above.

Polyesters may also be employed such as the reaction products of polyhydric alcohols such as those listed above and dibasic carboxylic acids such as succinic acid, maleic acid, adipic acid, phthalic acid and terephthalic acid.

Organic isocyanate is incorporated in the liquid blend in an amount to provide normally solid linear urethane polymers having an NCO/OH ratio from about 1.1:1 to 1.5:1. The expression NCO/OH ratio as employed herein may be defined as the ratio of total —NCO equivalent to total active hydrogen equivalent (i.e., hydroxyl plus water).

The organic isocyanates which can be employed in this invention for all purposes include, for example, polymethylene diisocyanates such as tetramethylene diisocyanate and hexamethylene diisocyanate and aromatic diisocyanates such as tolylene diisocyanate, 4,4'-diphenylmethane diisocyanate, 1,5-naphthalene diisocyanate, crude tolylene diisocyanate, crude 4,4'-diphenylmethane diisocyanate and adducts of tolylene diisocyanate with polyols such as ethylene glycol, dipropylene glycol, trimethylolpropane, neopentylglycol and polypropylene glycols.

The linear organic compound and isocyanate are generally added to the liquid blend at room temperature and this results in an exothermic reaction.

When it is desired to produce a relatively hard elastomer, it is preferred to employ a chemically hindered, aromatic diamine as the curing agent. The term "chemically hindered, aromatic diamine," as used herein, refers to an aromatic diamine which has one or more negative substituents on the aromatic ring to which the amine group is attached. Examples of such negative substituents are the halogen and nitro-groups. The chemicaly hindered, aromatic diamines which can be employed in preparing the elastomers by the one-step method include, for example, 4,4' - methylene - bis - (2 - fluoroaniline), 4,4' - methylene - bis - (2 - chloroaniline), 4,4' - methylene - bis - (2 - bromoaniline), 4,4' - methylene - bis - (2-nitroaniline), ortho-dichlorobenzidine and 4,4'-diamino-3,3'-dichlorodiphenyl. Another group of hindered diamines might have positive substituents on amino group such as 4,4' - methylene - bis - monomethylaniline. Conventional diamines may also be employed such as hexamethylene diamine, cyclohexylene diamine, p-phenylene diamine, p,p'-methylene dianiline, tolylene diamine, piperazine and 2,5-dimethyl piperazine.

When it is desired to produce a relatively soft elastomer, it is preferred to employ as curing agent various glycols such as ethylene glycol, propylene glycol, butane diol, hexane diol or their blends with various short triols such as trimethylolpropane, hexane triol, glycerine and pentaerythritol. These polyols can also be used in blends with diamines.

The amount of curing agent employed in either case is preferably about 1.0 equivalent for each excess isocyanate equivalent in the liquid adducts and normally solid linear urethane polymer. Usually the $$NCO/(OH+NH_2)$$

ratios are in the range of 0.8:1.25.

In general, a catalyst is added with the hydroxyl type curing agent. Any suitable prior art catalyst may be employed in the practice of this invention. These include, for example, metallo-organic salt catalysts and tertiary amines. A metallo-organic salt catalyst is a polyvalent metal salt of an organic acid having up to about 18 carbon atoms and being void of active hydrogen atoms. The organo portion of the salt may be either linear or cyclic and saturated or unsaturated. The polyvalent metal has a valence from about 2 to 4. Typical metallo-organic salts include various tin, lead, bismuth and mercury salts and any other metallo-organic catalysts such as 2-ethylhexoate, lead naphthenate, dibutyltin dilaurate, dibutyltin-di-2-ethylhexoate, di-(phenyl mercury)dodecyl succinate, dibutyltin-bis lauryl mercaptide and the like.

Examples of tertiary amines that may be used are N-methyl morpholine, trimethyl piperazine, trimethyl amine, tetramethylbutane diamine, dimethylamino propane, 1,4 - diazabicyclo[2,2,2]octane (triethylene diamine), and the like. The catalyst is used in an amount by weight corresponding to about 0.025 to 1.0% based upon the combined weight of all the above components and preferably in an amount by weight corresponding to about 0.05 to 0.5% of the combined weight of all components.

The following examples will illustrate the practice of this invention. The properties of the cured cast composition were obtained using standard ASTM test procedures as follows:

| | ASTM Designation |
|---|---|
| Tensile strength | D412–68. |
| Modulus | D412–68. |
| Elongation | D412–68. |
| Tear | D470–68. |
| Split tear | D1938–67. |
| Graves tear | D624–54. |
| Shore hardness | D2240–68. |
| Compression set | D395–67. |
| Bashore resilience | D2632–67. |

EXAMPLE 1

Preparation of liquid isocyanate-terminated adduct blend 4524 parts by weight (1 mole) of polyoxypropylene derivative of trimethylolpropane (mol. wt. 4524) and 17,316 parts by weight (9 moles) of polyoxypropylene glycol (mol. wt. 1924) are reacted with 3654 parts by weight (21 moles) of tolylene diisocyanate in a reactor equipped with stirirng, heating and cooling means under a nitrogen blanket. The reaction is conducted at 100–110° C. for 2 hours until the required NCO content (3.46±0.1%) is achieved.

Formation of normally solid linear isocyanate-terminated urethane polymer 9396 parts by weight (54 moles) of tolylene diisocyanate followed by 5184 parts by weight (27 moles) of tripropylene glycol are added into the above reactor containing the above liquid adduct blend. A quite apparent exothermic reaction takes place. In about one hour the reaction goes to completion. At this stage the free NCO content is at the level of 7.67 ±0.1%.

1908 parts by weight (18 moles) of diethylene glycol are then added to chain extend the reactive short adducts of tripropylene glycol into normally solid linear isocyanate-terminated urethane polymer to produce 9 moles of this polymer dissolved in the liquid blend of adducts. The NCO content is in the range of 3.83±0.1%.

Preparation of solid elastomer

This formulation is cured by addition of MOCA [4,4'-methylene-bis-(2-chloroaniline)] to the viscous blend of the normally solid linear isocyanate-terminated urethane polymer in liquid triol-diol adducts which is poured into containers and closed tightly.

EXAMPLE 2

A solid elastomer is prepared in exactly the manner of Example 1 with the exception that only 6 moles of the polyoxypropylene glycol adduct and 6 moles of the normally solid linear isocyanate-terminated urethane polymer are employed.

EXAMPLE 3

A solid elastomer is prepared in exactly the manner of Example 1 with the exception that only 3 moles of the polyoxypropylene glycol adduct and 3 moles of the normally solid linear isocyanate-terminated urethane polymer are employed.

A summary of the compositions and physical properties of the elastomers of Examples 1–3 is provided in Table I below.

TABLE I

| Example | 1 | 2 | 3 |
|---|---|---|---|
| Composition of elastomer: | | | |
| Triol adduct, mole | 1 | 1 | 1 |
| Diol adduct, moles | 9 | 6 | 3 |
| Normally solid linear urethane polymer, moles | 9 | 6 | 3 |
| Full weight of the polymer per one triol | 42,688 | 30,179 | 17,668 |
| Equivalent weight per NCO | 1,094.6 | 1,117.7 | 1,178 |
| NCO content, percent | 3.83 | 3.75 | 3.56 |
| NCO/NH$_2$ | 1.05 | 1.05 | 1.05 |
| MOCA, pts./100 pts. polymer | 11.6 | 11.39 | 10.81 |
| Properties of elastomer: | | | |
| Tensile strength, p.s.i. | 2,910 | 2,240 | 2,060 |
| 300% modulus, p.s.i. | 1,900 | 1,320 | 1,250 |
| 100% modulus, p.s.i. | 1,240 | 820 | 800 |
| Elongation, percent | 495 | 535 | 500 |
| Elongation set, percent | 25 | 23 | 18 |
| D–470 tear, p.i. | 140 | 102 | 75 |
| Split tear, p.i. | 440 | 255 | 205 |
| Graves tear, p.i. | 520 | 334 | 253 |
| Shore A hardness | 83 | 81 | 80 |
| Shore D hardness | 38 | 36 | 29 |
| Compression set, percent | 50 | 49 | 48 |
| Bashore resilience, percent | 21 | 26 | 27 |

EXAMPLE 4

Preparation of liquid isocyanate-terminated adduct blend 1200 parts by weight (1 mole) of polyoxypropylene derivative of hexane triol (mol. wt. 1200) and 11,760 parts by weight (6 moles) of polyoxypropylene glycol (mol. wt. 1960) are reacted with 2610 parts by weight (15 moles) of tolylene diisocyanate in a reactor equipped with stirring, heating and cooling means under a nitrogen blanket at 100–110° C. until the required NCO content of 3.8±0.1% is achieved.

Formation of normally solid linear isocyanate-terminated urethane polymer 4176 parts by weight (24 moles) of tolylene diisocyanate followed by 9000 parts by weight (12 moles) of polyester (mol. wt. 750) obtained by reaction of adipic acid with ethylene glycol in a mole ratio of 4:5 are added into the above reactor. A slight exothermic reaction takes place. In approximately one hour the reaction goes to completion. At this stage the free NCO content is at the level of 5.7±0.1%.

540 parts by weight (6 moles) of 1,4-butane diol are then added to chain extend the isocyanate-terminated polyester adducts into normally solid linear isocyanate-terminated urethane polymer to produce 6 moles of this polymer dissolved in the liquid blend. The NCO content at this stage is in the range of 3.87±0.1%.

Preparation of solid elastomer

This formulation is cured by addition of MOCA to the above solution which is poured into containers and closed tightly.

A summary of the composition and physical properties of the elastomer is shown in Table II below.

TABLE II

| Composition of elastomer: | Example 4 |
|---|---|
| Triol adduct, mole | 1 |
| Diol adduct, moles | 6 |
| Normally solid linear urethane polymer, moles | 6 |
| Full weight of the polymer per one triol | 29,286 |
| NCO content, percent | 3.87 |
| NCO/NH$_2$ | 1.05 |
| MOCA, pts./100 pts. polymer | 11.74 |
| Properties of elastomer: | |
| Tensile strength, p.s.i. | 3360 |
| 300% modulus, p.s.i. | 2050 |
| 100% modulus, p.s.i. | 1460 |
| Elongation, percent | 420 |
| Elongation set, percent | 20 |
| D–470 tear, p.i. | 146 |
| Split tear, p.i. | 279 |
| Graves tear, p.i. | 425 |
| Shore A hardness | 85 |
| Shore D hardness | 39 |
| Compression set, percent | 24 |
| Bashore resilience, percent | 28 |

EXAMPLE 5

Preparation of liquid isocyanate-terminated adduct blend 6375 parts by weight (1 mole) of polyoxypropylene derivative of trimethylolpropane capped with polyoxyethylene blocks (mol. wt. 6375) and 8400 parts by weight (4 moles) of polyoxytetramethylene glycol (mol. wt. 2100) are reacted with 1914 parts by weight (11 moles) of tolylene diisocyanate in a reactor equipped with stirring, heating and cooling means under a nitrogen blanket. The reaction is conducted at 100–110° C. until the required NCO content of 2.77±0.1% is achieved.

Formation of normally solid linear isocyanate-terminated urethane polymer 4176 parts by weight (24 moles) of tolylene diisocyanate were added to the above contents of the reactor, followed by 2304 parts by weight (12 moles) of tripropylene glycol.

An exothermic reaction takes place. In about one hour the reaction goes to completion. At this stage the free NCO content is at the level of 6.34±0.1%.

944 parts by weight (8 moles) of 1,6-hexane diol are added to chain extend the reactive short adducts of tripropylene glycol into normally solid linear isocyanate-terminated urethane polymers to produce 4 moles of these polymers dissolved in the liquid blend. The NCO content at this stage is in the range of 3.31±0.1%.

Preparation of solid elastomer

This formulation is cured by addition of MOCA to the solution of the normally solid linear isocyanate-terminated urethane polymer in liquid triol-diol adudcts which is packed in tightly closed containers.

A summary of the composition and physical properties of this elastomer is shown in Table III below.

TABLE III

| Composition of elastomer: | Eaxmple 5 |
|---|---|
| Triol adduct, mole | 1 |
| Diol adduct, moles | 3 |
| Normally solid linear urethane polymer, moles | 4 |
| Full weight of the polymer per one triol | 24,113 |
| Equivalent weight per NCO | 1,269 |
| NCO content, percent | 3.31 |
| NCO/NH$_2$ | 1.02 |
| MOCA, pts./100 pts. of polymer | 10.33 |
| Properties of elastomer: | |
| Tensile strength, p.s.i. | 3100 |
| 300% modulus, p.s.i. | 2240 |
| 100% modulus, p.s.i. | 1580 |
| Elongation, percent | 560 |
| Elongation set, percent | 15 |
| D-470 tear, p.i. | 128 |
| Split tear, p.i. | 260 |
| Graves tear, p.i. | 388 |
| Shore A hardness | 80 |
| Shore D hardness | 86 |
| Compression set, percent | 20 |
| Bashore resilience, percent | 38 |

EXAMPLE 6

Preparation of liquid isocyanate-terminated adduct blend 3606 parts by weight (1 mole) of polyoxypropylene derivative of glycerine (mol. wt. 3606) and 8160 parts by weight (6 moles) of polyoxypropylene glycol (mol. wt. 1360) are reacted with 2610 parts by weight (15 moles) of tolylene diisocyanate in the manner described in Example 1.

Formation of normally solid linear isocyanate-terminated urethane polymer 3132 parts by weight (18 moles) of tolylene diisocyanate are added to the above contents of the reactor, followed immediately by 4608 parts by weight (9 moles) of polycaprolactone diol (mol. wt. 512).

When the reaction is completed 540 parts by weight (6 moles) of 1,4-butane diol are added for chain extension of the polycaprolactone diol adducts into normally solid linear isocyanate-terminated urethane polymer to produce 3 moles of this polymer. The final NCO content is 3.89 ±0.1%.

Preparation of solid elastomer

This formulation is cured by addition of MOCA to the solution of the normally solid linear isocyanate-terminated urethane polymer in the liquid triol-diol adducts which is packed in tightly closed containers.

A summary of the composition and physical properties of this elastomer is shown in Table IV below.

TABLE IV

| Composition of elastomer: | Example 6 |
|---|---|
| Triol adduct, mole | 1 |
| Diol adduct, moles | 6 |
| Normally solid linear urethane polymer, moles | 3 |
| Full weight of the polymer per one triol | 22,656 |
| Equivalent weight per NCO | 1,080 |
| NCO content, percent | 3.89±0.1 |
| NCO/NH$_2$ | 1.05 |
| MOCA, pts./100 pts. polymer | 11.70 |
| Properties of the elastomer: | |
| Tensile strength, p.s.i. | 4100 |
| 300% modulus, p.s.i. | 2700 |
| 100% modulus, p.s.i. | 1070 |
| Elongation, percent | 650 |
| Elongation set, percent | 30 |
| D-470 tear, p.i. | 134 |
| Split tear, p.i. | 380 |
| Graves tear, p.i. | 420 |
| Shore A hardness | 92 |
| Shore D hardness | 41 |
| Compression set, percent | 18 |
| Bashore resilience, percent | 38 |

EXAMPLES 7 AND 8

Two isocyanate-terminated polymers are separately prepared and blended. One contains a long triol adduct with short diol adduct and dimers. The second polymer contains a long diol adduct as a solvent medium for a small amount of normally solid linear isocyanate-terminated urethane polymer. They are blended at two ratios as shown in Table V below and cured with MOCA.

Preparation of first polymer 6120 parts by weight (1 mole) of polyoxypropylene derivative of trimethylolpropane capped with polyoxyethylene blocks (mol. wt. 6120) are reacted with 1218 parts by weight (7 moles) of TDI at 100° C. for 2 hours. Free NCO is in the range of 6.3±0.1%. The product is cooled down to 70° C. and an additional 1218 parts by weight TDI added, followed by 532 parts by weight (7 moles) propylene glycol. The contents exotherm and the reaction is maintained at 100° C. for 1 hour. Free NCO is in the range of 5.08±0.1%.

Preparation of second polymer 3849 parts by weight (2 moles) of polyoxypropylene glycol (mol. wt. 1925) are reacted with 1044 parts by weight (6 moles) of tolylene diisocyanate at 100° C. for 2 hours. Free NCO is in the range of 6.87±0.1%. The product is cooled down to 70° C. and an additional 1044 parts by weight (6 moles) TDI added, followed immediately by 768 parts by weight (4 moles) tripropylene glycol. The contents of the reactor will exotherm and the reaction is maintained at 100° C. for one-half hour. 318 parts by weight (3 moles) diethylene glycol are then added and the mixture heated at 100–110° C. for 1 hour to produce normally solid linear isocyanate-terminated urethane polymer. A free NCO content of 3.58±0.1% is achieved.

Preparation of solid elastomer

As stated above, the first and second polymers are blended and cured by addition of MOCA in proportions shown in Table V below, and the composition is packed in tightly closed containers.

A summary of the compositions and physical properties of these elastomers is shown in Table V below.

TABLE V

| Example | 7 | 8 |
|---|---|---|
| Composition of elastomers: | | |
| Equivalent of triol polymer | 0.2 | 0.5 |
| Equivalent of diol polymer | 0.8 | 0.5 |
| MOCA, equivalent | 1.0 | 1.0 |
| Amount of MOCA per 100 parts of polymer blend | 11.0 | 12.3 |
| Properties of elastomers: | | |
| Tensile strength, p.s.i. | 4,300 | 4,740 |
| 300% modulus, p.s.i. | 2,680 | 3,370 |
| 100% modulus, p.s.i. | 1,860 | 2,240 |
| Elongation, percent | 445 | 400 |
| Elongation set, percent | 20 | 26 |
| D-470 tear, p.i. | 140 | 106 |
| Split tear, p.i. | 327 | 213 |
| Graves tear, p.i. | 464 | 421 |
| Shore A hardness | 98 | 97 |
| Shore D hardness | 48 | 47 |
| Compression set, percent | 36 | 32 |
| Bashore resilience, percent | 39 | 38 |

EXAMPLE 9

4524 parts by weight (1 mole) of polyoxypropylene derivative of hexane triol capped with 7% ethylene oxide (mol. wt. 4524) and 2298 parts by weight (3 moles) of polyoxypropylene glycol (mol. wt. 766) are reacted with 4698 parts by weight (27 moles) of TDI at 100° C. for 1-2 hours until the free NCO content of 9.3±0.1% is reached. 684 parts by weight (9 moles) of propylene glycol are then added with a resulting fast reaction with a slight exotherm. 540 parts by weight (6 moles) 1,4-butane diol are then added which chain extends the short propylene glycol adducts to normally solid linear isocyanate-terminated urethane polymer. A free NCO content at the level of 4.94±0.1% is achieved. This formulation is cured by addition of ethylene glycol and 1,2,4-trimethyl piperazine to the solutions of the normally solid linear isocyanate-terminated urethane polymer in the liquid triol-diol adducts in the proportions shown in Table VI below, and the composition is packed in tightly closed containers.

A summary of the composition and physical properties of this elastomer is shown in Table VI below.

TABLE VI

| Composition of elastomer: | Example 9 |
|---|---|
| Polymer, parts by weight | 100 |
| Equivalents | 1.05 |
| Ethylene glycol, parts by weight | 3.45 |
| Equivalents | 1.00 |
| 1,2,4-trimethyl piperazine, percent | 0.2 |
| Properties of elastomer: | |
| Tensile strength, p.s.i. | 3050 |
| 300% modulus, p.s.i. | 2150 |
| 100% modulus, p.s.i. | 1480 |
| Elongation, percent | 442 |
| Elongation set, percent | 28 |
| D-470 tear, p.i. | 142 |
| Split tear, p.i. | 404 |
| Graves tear, p.i. | 546 |
| Shore A hardness | 96 |
| Shore D hardness | 44 |
| Compression set, percent | 38 |
| Bashore resilience, percent | 29 |

What is claimed is:

1. A process for preparing polyurethane elastomers which comprises:
   (A) reacting an excess of organic diisocyanate with:
     (1) polyether glycol having an average equivalent weight of about 500 to 1,500, and
     (2) polyether polyol having more than 2 hydroxyl groups and an equivalent weight of about 45 to 2,500, to obtain a liquid isocyanate-terminated reaction product,
   (B) reacting glycol having an average equivalent weight of about 31 to 400 with an excess of organic diisocyanate in the presence of the isocyanate-terminated reaction product from (A) whereby a second reaction product is formed,
   (C) chain extending the product from (B) by reacting said product (B) with glycol, and
   (D) curing the resulting composition with a curing agent.

2. The process in accordance with claim 1 wherein said polyether polyol has about 3 to 6 terminal hydroxyl groups.

3. The process of claim 2 wherein said glycol of step (B) is selected from the group consisting of: ethylene glycol, 1,2-propylene glycol, 1,3-propylene glycol, 1,2-butanediol, 1,4-butanediol, 1,6-hexanediol, and alkylene oxide adducts thereof, a polycaprolactone diol, and adipate esters of ethylene glycol.

4. The process of claim 3 wherein said polyether glycol is selected from the group consisting of alkylene oxide adducts of ethylene glycol, propylene glycol, and butanediol.

5. The process of claim 4 wherein said polyether polyol is selected from a group consisting of: alkylene oxide adducts of trimethylolpropane, glycerol, pentaerythritol, hexane triol, sorbitol and sucrose.

6. The process of claim 5 wherein (a) the mole ratio of said polyether glycol to said polyether polyol is from about 1:1 to 9:1, (b) the mole ratio of said glycol of step (B) to said polyether glycol plus said polyether polyol is from about 2:1 to 6:1, (c) said diisocyanate, said glycols, and said polyether polyol are employed in amounts to provide an NCO/OH ratio from about 2:1 to 6:1, and (d) the quantity of said curing agent is employed in an amount to provide an equivalent NCO/(OH+NH$_2$) ratio of about 0.8:1 to 1.25:1.

7. The process of claim 6 including a catalyst in an amount from about 0.025-1.0% by weight of the total composition.

8. The process of claim 7 wherein the isocyanate employed is toluene diisocyanate.

9. The process of claim 8 wherein a mixture of a plurality of said glycols of step (B) is employed.

10. The process of claim 9 wherein said curing agent is selected from the group consisting of: 4,4'-methylene bis(2-chloroaniline), ethylene glycol, propylene glycol and butane diol.

11. The product produced by the process of claim 1.

References Cited

UNITED STATES PATENTS

| | | | |
|---|---|---|---|
| 3,012,987 | 12/1961 | Ansul | 260—45.4 |
| 3,170,003 | 2/1965 | Genski et al. | 260—858 |
| 3,240,842 | 3/1966 | Saunders | 260—858 |
| 3,271,352 | 9/1966 | Weinberg | 260—37 |
| 3,373,128 | 3/1968 | Wooster | 260—29.1 |
| 2,814,605 | 11/1957 | Stilman | 260—42 |
| 2,870,114 | 1/1959 | Shrimpton et al. | 260—45.4 |
| 2,880,192 | 3/1959 | Coffey et al. | 260—45.4 |
| 2,888,432 | 5/1959 | Fauser | 260—45.4 |
| 2,933,477 | 4/1960 | Hostettler | 260—77.5 |
| 3,194,793 | 7/1965 | Kogon | 260—77.5 |
| 3,294,724 | 12/1966 | Axelrood | 260—29.2 |
| 3,395,109 | 7/1968 | Molitor et al. | 260—22 |

OTHER REFERENCES

Darr et al.: Effect of Molecular Structure on Properties of Highly Cross-Linked Urethane Polymers, Ind. and Eng. Chem. Prod. Res. and Development, vol. II, September 1963, pp. 194-197.

DONALD E. CZAJA, Primary Examiner

H. S. COCKERAM, Assistant Examiner

U.S. Cl. X.R.

260—75 NE, 77.5 AS, 77.5 AB